United States Patent [19]

Tosaka et al.

[11] Patent Number: 5,001,505
[45] Date of Patent: Mar. 19, 1991

[54] CAMERA

[75] Inventors: Yoichi Tosaka; Shosuke Haraguchi, both of Kanagawa, Japan

[73] Assignee: Canon Kabushiki Kaisha, Tokyo, Japan

[21] Appl. No.: 360,762

[22] Filed: Jun. 2, 1989

[30] Foreign Application Priority Data

Jun. 6, 1988 [JP] Japan .................. 63-138748

[51] Int. Cl.⁵ .............................................. G03B 1/18
[52] U.S. Cl. .................................. 354/173.1; 354/288
[58] Field of Search ....... 354/173/1, 173.11, 212–216, 354/288, 484

[56] References Cited

U.S. PATENT DOCUMENTS 4,771,303  9/1988  Matsumoto et al. ................. 354/288

FOREIGN PATENT DOCUMENTS 60-68528  5/1985  Japan .

Primary Examiner—Michael L. Gellner
Assistant Examiner—David M. Gray
Attorney, Agent, or Firm—Fitzpatrick, Cella, Harper & Scinto

[57] ABSTRACT

A camera incorporating a capacitor for flashing a flash device is arranged to have the capacitor disposed within a hollow portion of a film take-up spool, to have a power source battery accommodating space provided in the vicinity of the spool, and to have a motor which serves at least as a film transporting drive source disposed in the vicinity of a film cartridge stowing chamber.

17 Claims, 4 Drawing Sheets

FIG.7 (PRIOR ART)
FIG.8 (PRIOR ART)
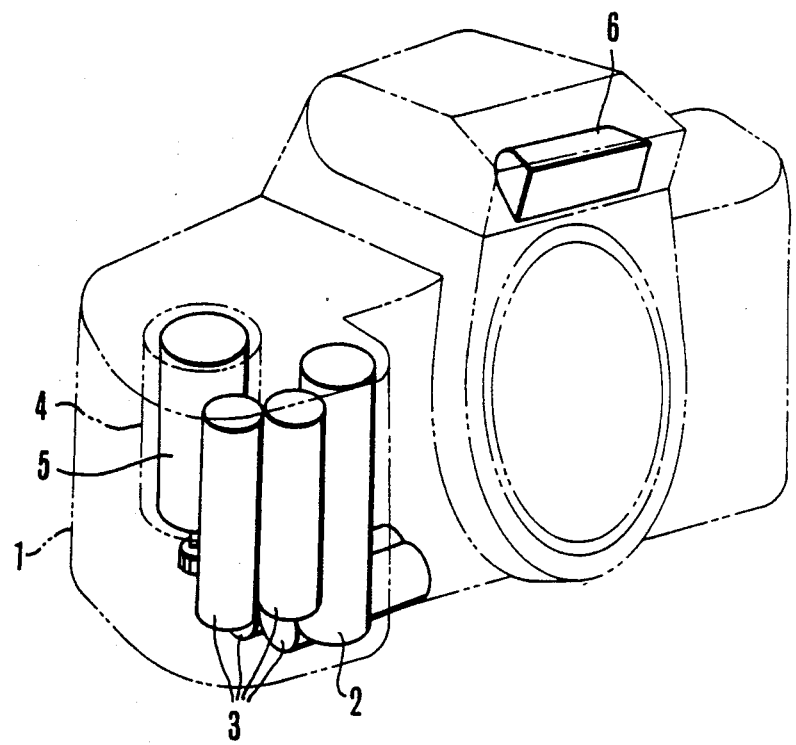
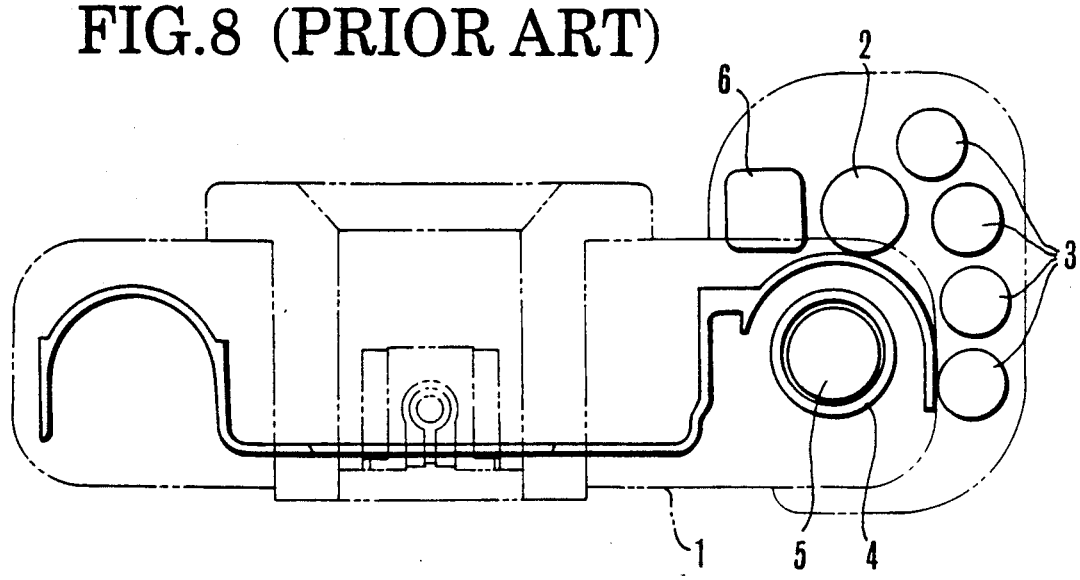

CAMERA

BACKGROUND OF THE INVENTION

1. Field of the Invention

This invention relates to a camera which permits a flash device to be incorporated therein or mounted thereon.

2. Description of the Related Art

When incorporating a flash device into a camera, the layout of various component parts plays an important role in determining the size of the camera.

The component parts requiring keen attention in this respect include a motor for transporting the film and for charging various mechanisms; a light emitting part consisting of a reflection member, a xenon lamp, etc.; a capacitor for storing the light emission energy of the flash device; and a battery. The conventional layout of these component parts is as described below:

FIG. 6 of the accompanying drawings shows a first example of the conventional layout. A camera is illustrated as viewed from above, including an external form 1 of the camera, a capacitor 2, a battery 3, a film take-up spool 4 for film winding, a motor 5, and a flash emitting part 6. The capacitor 2 and the battery 3 are vertically disposed approximately in front of the spool 4 and are stowed within a grip to permit an easy grip on the camera. The motor 5 is vertically placed within the spool 4. The flash emitting part 6 is disposed above the front part of a pentagonal prism which is not shown. A camera which has a boosting capacitor disposed within a protruding grip has been disclosed in U.S. patent application Ser. No. 648,702 filed on Sept. 7, 1984.

FIG. 7 is an oblique view showing a second example of the conventional layout. In FIG. 7, the same members as those of FIG. 6 are indicated by the same reference numerals. In this case, four batteries 3 are used. Two batteries of them are laterally disposed approximately beneath the spool 4, and other two batteries are vertically disposed approximately in front of the spool 4. A motor 5 is vertically disposed within the spool 4. A flash emitting part 6 is disposed above the front side of the pentagonal prism. A capacitor 2 is vertically disposed approximately in front of the spool 4 like in the case of FIG. 6. A grip is formed jointly by the two of the batteries 3 and the capacitor 2.

FIG. 8 is a top view of a camera showing a third example of the conventional layout. In the third example, a motor 5 is also disposed within the spool 4. A flash emitting part 6 which is arranged to pop up is disposed approximately in front of a spool 4. A capacitor 2 and four batteries 3 are vertically disposed on one side of the flash emitting part 6.

In the layout of the kind having the motor 5 disposed within the spool 4 as described above, a reduction gear train is arranged either on the upper side or on the lower side of the spool 4. The spool 4 and a sprocket are arranged to be driven by the gear train. This arrangement not only effectively utilizes an available space but also facilitates arrangement of the gear train into one unit including the motor 5.

While the conventional layout examples have the above-stated advantages, they have a problem in that, with the camera arranged to incorporate a flash device therein, the size of the camera becomes large and, particularly, the size of the grip becomes too large for easy gripping. Besides, the shape of the camera also becomes disagreeable in terms of design.

A first cause for the problem resides in that the diameter of the spool 4 cannot be reduced because of the motor 5 to be disposed therein. As a result, the size of a chamber for the spool 4 on which the film is to be taken up also increases. A second cause for the problem resides in the following: To supply the energy required by the flash device, it is necessary to increase the number of batteries 3 or to increase the capacity of the battery (a lithium battery, such as 2CR5, in this instance). Whereas, the grip is formed and arranged to house the capacitor for the flash device in addition to the battery.

Further, a layout which has the capacitor for the flash device simply disposed within a take-up spool has been disclosed in Japanese Laid-Open Utility Model Application No. SHO 60-68528.

SUMMARY OF THE INVENTION

One aspect of this invention resides in the provision of a camera, wherein a capacitor for flashing a flash device is disposed within a film take-up spool; a battery stowing space is provided in the vicinity of the spool; and a motor is disposed in the vicinity of a film cartridge chamber. The camera according to this invention which is arranged in this manner is capable of incorporating the capacitor for flashing the flash device without increasing the size of the grip of the camera.

The above and further aspects and features of this invention will become apparent from the following detailed description of embodiments thereof taken in connection with the accompanying drawings.

BRIEF DESCRIPTION OF THE DRAWINGS

FIG. 7 is an oblique view showing a second layout example of prior art.

FIG. 8 is a plan view showing a third layout example of prior art.

DETAILED DESCRIPTION OF THE PREFERRED EMBODIMENTS

Figure 1:
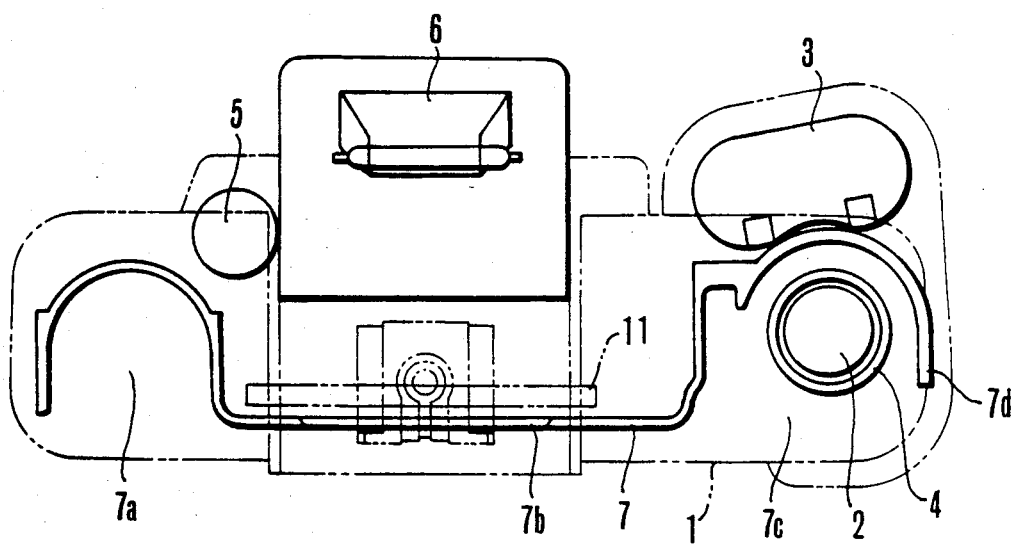
FIG. 1 is a plan view showing a first embodiment of this invention.
Figure 2:
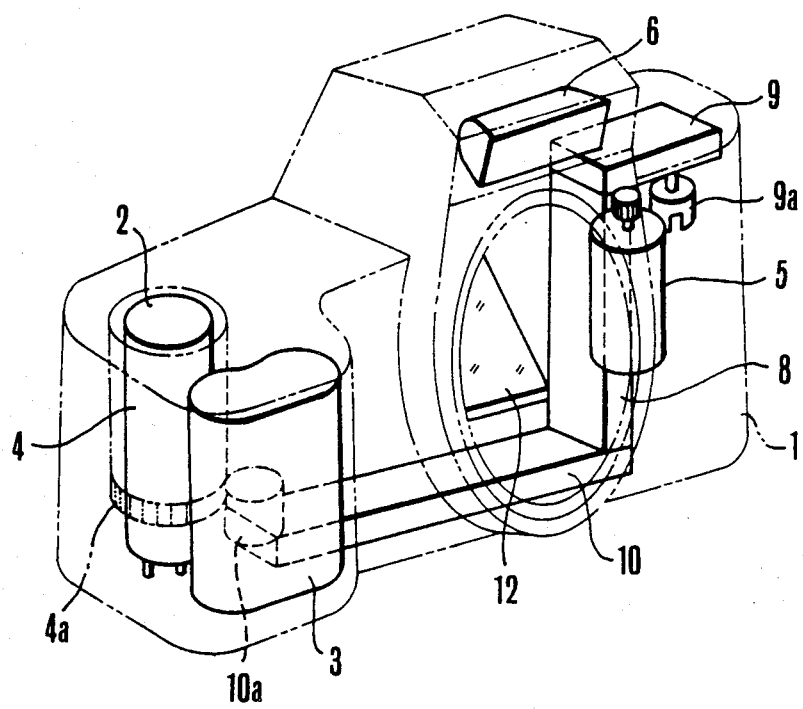
FIG. 2 shows the same in an oblique view.
Figure 3:
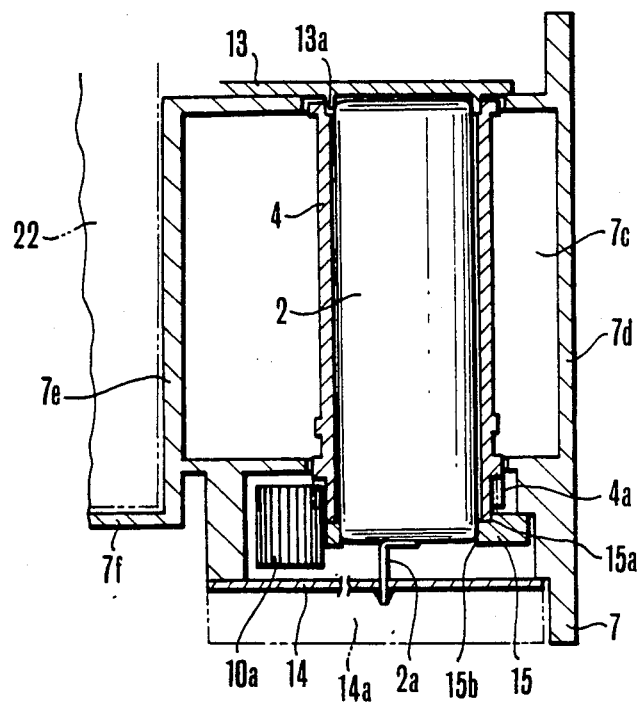
FIG. 3 is a sectional view showing a part of the same embodiment.

FIGS. 1 to 3 show a camera arranged as a first embodiment of this invention. FIG. 1 shows the camera as viewed from above. The same parts as those of the above examples of the prior art arrangement are indicated by the same reference numerals.

Referring to FIG. 1, a camera body 7 forms a film cartridge chamber 7a, an aperture 7b, a spool chamber 7c, etc.. In FIG. 1, a transverse sectional view taken approximately across the middle part of the camera is schematically illustrated. The embodiment differs from the conventional layout in that the motor 5 is disposed farther forward than the middle part of the film cartridge chamber 7a and that the capacitor 2 is disposed within the spool 4.

FIG. 2 shows the camera in an oblique view. A charge unit 8 which includes the motor 5 is arranged to charge a shutter 11 (FIG. 1) and to drive a mirror 12. In addition to that, the charge unit 8 is arranged to transmit rotation, as necessary, to a film rewinding unit 9 which is provided with a film rewinding fork 9a and also to a film transport unit 10 which is arranged to wind or take up the film by means of the spool 4 and a sprocket which is not shown. The transport unit 10 is disposed on the lower side of the camera. An end gear 10a of the transport unit 10 engages a spool gear 4a which is provided at the lower part of the spool 4 and which is arranged to cause the spool 4 to rotate together.

FIG. 3 is a sectional view showing the spool part as viewed from behind the camera. The upper part of the spool 4 is rotatably carried by an annular projection 13a of an upper base plate 13 which is secured to the camera body 7. The lower part of the spool 4 is also rotatably carried by a stepped part 15a of a lower base plate 15 which is secured to the camera body 7. The above-stated spool gear 4a is arranged in a hidden part of the camera body 7 to engage the end gear 10a of the transport unit 10 as mentioned above. The spool 4 has a hollow portion within which a capacitor 2 is disposed.

The capacitor 2 is positioned with its upper part fitted into the inner circumferential side of the annular projection 13a of the upper base plate 13 and its lower part fitted into a hole 15b provided in the lower base plate 15. A terminal 2a of the capacitor 2 pierces through a circuit board 14 and is conductively secured thereto by soldering. The circuit board 14 is provided with a space 14a for accommodating electric parts to be mounted on the circuit board 14 for a flash device.

The lateral position of the circuit board 14 is determined by the fixed capacitor 2 while its vertical position is determined by securing it to the camera body 7 by means of screws or the like.

The spool 4 and the capacitor 2 are thus positioned in common by the same upper and lower base plates 13 and 15. This allows them to be accurately positioned, so that a clearance between them can be minimized to permit, accordingly, an increase in the capacity of the capacitor 2 to be stowed inside the spool 4.

The arrangement to have the motor 5 disposed in front of the film cartridge chamber 7a may invite apprehension for an increase in the size of a part on the left side of an aperture 7b of the camera body 7 as viewed on FIG. 1. However, there is an inherent dead space between the film cartridge chamber 7a and a lens mount provided for attaching and detaching a lens. In addition to that, the total length of the motor 5 is considerably shorter than the diameter of the lens mount in general. These favorable points facilitate designing work to have the motor 5 within this dead space without any problem in respect of dimensions and appearance. In actuality, some known camera of the kind incorporating two or three motors has one of the motors disposed in this position.

Further, the arrangement to set the capacitor 2 within the spool 4 has the following advantage: Since the inside of the grip is required to house only the battery 3, the size and the shape of the grip can be appositely designed for a firm and easy grip. Especially, with the battery 3 disposed close to the aperture 7b rather than the side wall 7d of the spool chamber 7c, the transverse dimension of the camera remains the same as that of a camera incorporating no flash device. Whereas, this advantage is hardly attainable by the conventional camera of the kind having both the capacitor 2 and the battery 3 disposed within the grip.

Another advantage lies in that the electric parts can be mounted on the circuit board 14. The advantage is salient especially with a boosting circuit mounted on the circuit board 14 for charging as it minimizes an electrical energy loss after boosting. This is because the motor 5 is disposed on the side of the film cartridge chamber 7a to obviate the necessity of having any reduction gear train just below the spool 4. The arrangement to have a boosting circuit disposed in the space 14a beneath the spool 4 effectively prevents an IC or the like from being affected by noises. Generally, a boosting circuit generates a high degree of noise while an IC is vulnerable to noises and is desired to be shielded from the boosting circuit. Hence, many cameras are arranged to have an IC disposed either above a pentagonal prism or in between the camera body and a box-shaped mirror box formed around and beneath the mirror. Referring to FIG. 3, the IC is disposed in a space 22 defined by a wall 7e of the spool chamber 7c on the side of the aperture and a lower wall 7f. The mounting space 14a and the IC are separated by means of parts necessary for forming the camera body. The IC thus can be prevented from being affected by noises.

It is a further advantage of the embodiment that a capacitor 2 which is of a relatively large capacity can be stowed within the spool 4 without increasing the diameter of the spool 4. Generally, the motor 5 disposed within the spool 4 measures between 15 and 18 mm in diameter. The diameter of the motor 5 is determined almost entirely by the load to be imposed by the film and a shutter charging action and the kind of the battery 3. A small diameter motor 5 results in an inadequate output efficiency, etc. Meanwhile, the capacitor 2 has no restriction in terms of shape. For example, for a flash device of the guide number of about 12 to 15, the capacitor 2 has a capacity between 170 and 210 $\mu$F, a diameter of about 14 or 15 mm and a length between 45 and 60 mm. In other words, this permits the spool 4 to have a diameter which is the same as or smaller than the diameter of a spool arranged to have the motor 5 disposed therein. However, although the spool 4 becomes longer than the motor 5 which normally measures about 35 mm in total length when disposed within the spool 4, the length of the capacitor 2 does not have to be limited by the length of the spool 4. It can be housed by the spool 4 as long as its upper and lower ends are within a cover forming the outside appearance of the camera, as shown in FIG. 3 and as in the cases of other embodiments which will be described later. The conventional arrangement which has the capacitor disposed within the grip is disadvantageous also in this connection. In other words, on the upper side of the camera body, there is provided a shutter release button in most cases. Therefore, in respect of the operability of the release button, the height of the upper side of the camera cannot be increased too much. Further, if the diameter of the capacitor 2 is increased to cope with the vertical dimensional limitation, the size of the grip would further increase.

Figure 4:
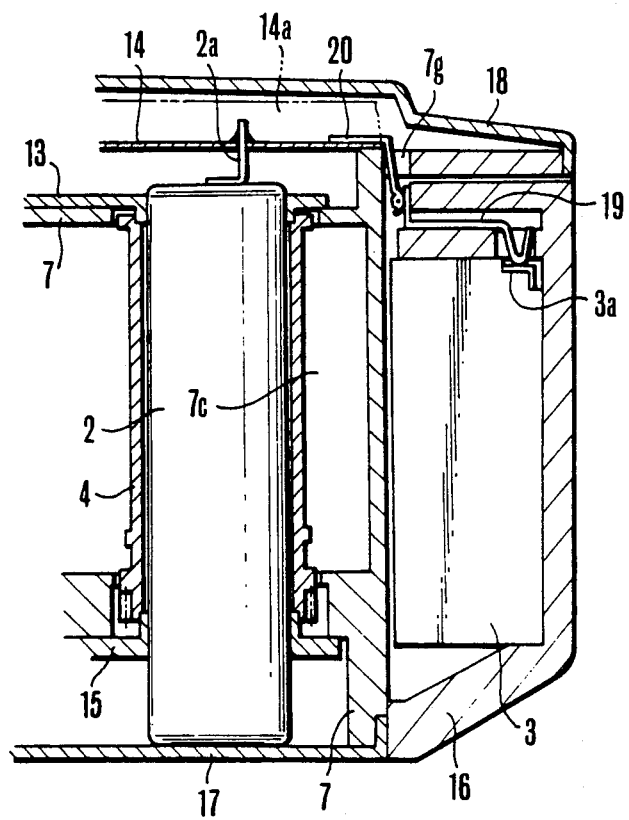
FIG. 4 is a sectional view showing a part of a second embodiment of the invention.

FIG. 4 is a vertical section showing the spool part of a second embodiment of the invention including the battery 3 disposed within the grip. As in the case of the first embodiment, the spool 4 is carried by the upper and lower base plates 13 and 15. Meanwhile, the capacitor 2 is fitted into and pierces through both the base plates 13 and 15. The capacitor 2 has its lower end position limited by a bottom cover 17 and its upper end conductively secured to the circuit board 14 via the terminal 2a.

An external upper cover 18 provides a space 14a for accommodating electric parts between the circuit board 14 and the external upper cover 18. A grip 16 which is detachable from the camera body 7 is arranged to accommodate the battery 3. The grip 16 has a battery contact 19 secured thereto. The contact 19 has one end thereof arranged to be in resilient contact with the contact 3a of the battery 3 and the other end opposed to a connection contact 20 on the camera body side. This connection contact 20 which pierces through a hole 7g of the camera body 7 is arranged to be in resilient contact with the battery contact 19 when the grip 16 is attached to the camera body 7 as shown in FIG. 4. The other end of the contact 20 is connected to the circuit board 14.

In the case of the second embodiment, the capacity of the capacitor 2 is increased by allowing it to almost fully extend between the upper and lower exterior members as mentioned in the foregoing. Further, the battery 3 is connected to the circuit board 14 of the capacitor 2 only via two contact pieces. This arrangement reduces an electrical energy loss due to contact resistance and line resistance.

Figure 5:
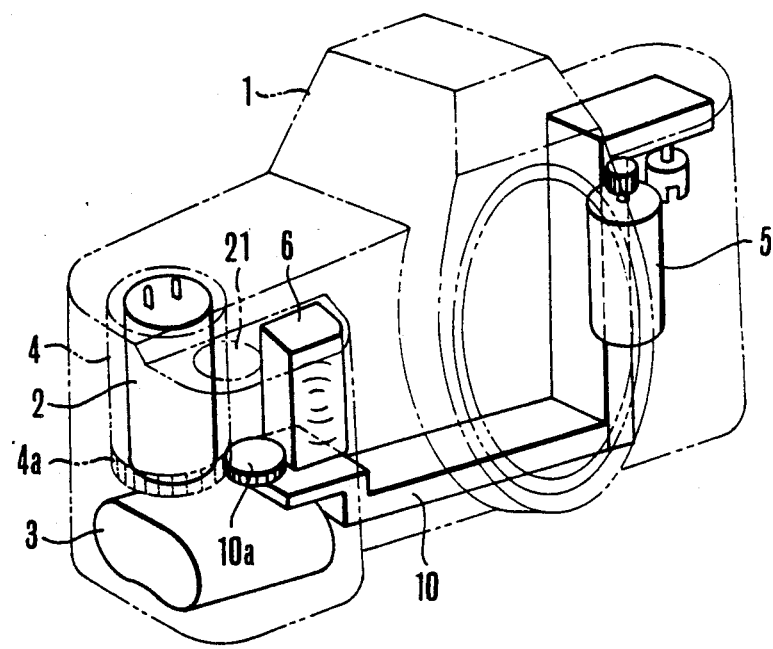
FIG. 5 is an oblique view showing a third embodiment of the invention.
Figure 6:
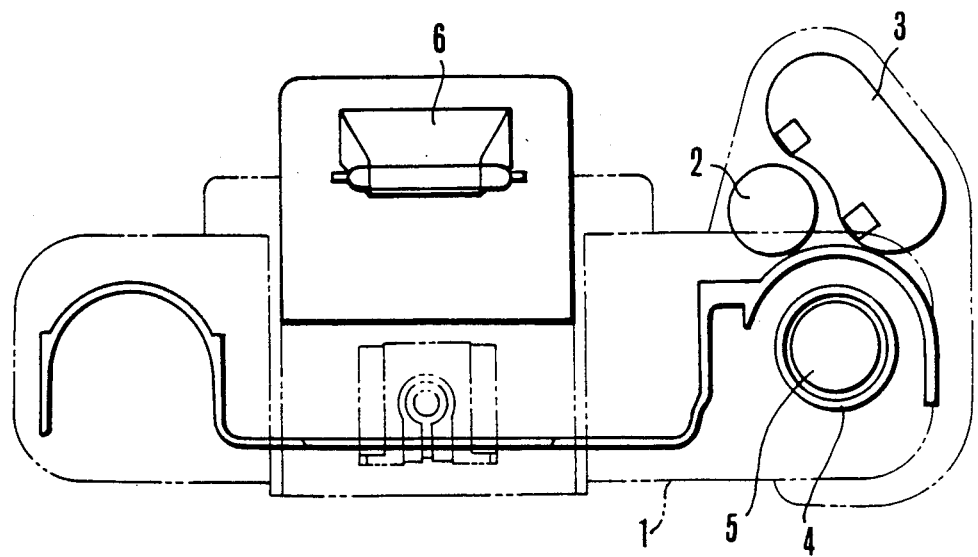
FIG. 6 is a plan view showing a first layout example of prior art.

FIG. 5 shows a third embodiment of the invention in an oblique view. In this case, the allocation and arrangement of the capacitor 2, the circuit board 14 (not shown), the spool 4 and the motor 5 are the same as in the case of the second embodiment. However, the third embodiment differs from the second in the following points: The lower part of the capacitor 2 ends at the position of the spool gear 4a. The battery 3 is disposed sidewise beneath the lower end of the capacitor 2. The grip has the release button 21 disposed on the upper part thereof and is arranged to house a pop-up type flash emitting part 6. The flash emitting part 6 is arranged to be popped up by a manual operation in a known manner. The mechanism for this manual pop-up operation has been arranged in varied manners which are well known and, therefore, is omitted from description given here. However, it can be easily arranged within the grip.

Since the battery 3 is stowed below the film transport unit 10, the total height of the camera somewhat increases. However, with the flash emitting part 6 stowed within the grip, the third embodiment has no protruding part above the pentagonal prism due to having the flash emitting part 6 disposed there like the other embodiments. Therefore, it is an advantage of the third embodiment that the degree of disagreeableness of appearance due to inclusion of the flash device is less than the conventional cameras. Besides, the arrangement of the third embodiment causes no difference in width from the conventional camera of the kind incorporating a flash device.

In accordance with the arrangement of the embodiments described, a capacitor for flashing a flash device is disposed within a hollow portion of the film take-up spool; a power supply battery is disposed in the vicinity of the spool; and at least a motor for shutter charging and film transport is disposed in the vicinity of the film cartridge chamber. As a result, among the things that must be disposed around the spool chamber and have a great influence on the external form of the camera, the invented arrangement leaves only the battery. Therefore, a grip which is formed near the spool chamber can be prevented from becoming larger than that of a camera incorporating no capacitor for a flash device. Further, the invention is easily practiced without being restricted by the type and position of a flash device.

While the embodiment has been described on the assumption that the camera is of the flash device incorporating type, the invention is applicable to cameras of any other types so long as they incorporate therein capacitors for flashing a flash device irrespective as to whether the flash device is attachable and detachable to and from the camera.

What is claimed is:

1. A camera incorporating therein a capacitor for flashing a flash device, comprising:
    a film take-up spool disposed on one side of an aperture and having a hollow portion within which said capacitor is disposed;
    a stowing chamber for stowing a film cartridge, said chamber being disposed on another side of said aperture;
    a grip part protrusively disposed at a position in front of said spool;
    a battery accommodating space for accommodating a power source battery, said battery accommodating space being provided in the vicinity of said spool; and
    a motor serving as a drive source at least for transporting a film, said motor being disposed in the vicinity of said chamber for stowing a film cartridge.

2. A camera according to claim 1, wherein said battery accommodating space is provided at a position in front of said spool.

3. A camera according to claim 1, wherein said battery accommodating space is provided at a position beneath said spool.

4. A camera according to claim 1, wherein said motor is disposed at a position in front of said stowing chamber and close to an aperture.

5. A camera according to claim 2, wherein said motor is disposed at a position in front of said stowing chamber and close to an aperture.

6. A camera according to claim 3, wherein said motor is disposed at a position in front of said stowing chamber and close to an aperture.

7. A camera according to claim 1, further comprising a circuit board electrically connected to said capacitor, said circuit board being disposed at a position crossing an axial direction of said spool.

8. A camera according to claim 7, further comprising a connection member for electrically connecting said circuit board to said battery.

9. A camera according to claim 1, further comprising first and second supporting members positioned above and beneath said spool in an axial direction thereof to rotatably support said spool, said first and second supporting members being arranged to also support said capacitor.

10. A camera incorporating therein a capacitor for flashing a flash device, comprising:
    a film take-up spool disposed on one side of an aperture;
    a stowing chamber for stowing a film cartridge, said stowing chamber being disposed on another side of said aperture;
    a grip part protrusively disposed at a position in front of said spool;
    said capacitor disposed within a hollow portion of said spool;

a battery accommodating space for accommodating a power source battery, said battery accommodating space being provided within said grip part; and a motor serving as a drive source at least for transporting a film, said motor being disposed in the vicinity of said stowing chamber.

11. A camera according to claim 10, wherein said battery accommodating space is provided at a position in front of said spool.

12. A camera according to claim 10, wherein said battery accommodating space is provided at a position beneath said spool.

13. A camera according to claim 10, wherein said motor is disposed at a position in front of said stowing chamber and close to an aperture.

14. A camera according to claim 10, further comprising a circuit board electrically connected to said capacitor, said circuit board being disposed at a position crossing an axial direction of said spool.

15. A camera according to claim 14, further comprising a connection member for electrically connecting said circuit board to said battery.

16. A camera according to claim 15, wherein said grip part is arranged to be attachable and detachable to and from the camera, and wherein said connection member has a part thereof secured to said grip part and is arranged to electrically connect said battery to said circuit board by coming into contact with another part when said grip is attached to the camera.

17. A camera according to claim 10, further comprising first and second supporting members positioned above and beneath said spool in an axial direction thereof to rotatably support said spool, said first and second supporting members being arranged to also support said capacitor.

* * * * *